P. B. JAGGER.
MOLDING AND/OR COMPACTING PLASTIC, FLUID, POWDERED, GRANULAR, OR THE LIKE SUBSTANCES.
APPLICATION FILED FEB. 25, 1921.
1,428,097.
Patented Sept. 5, 1922.
2 SHEETS—SHEET 1.
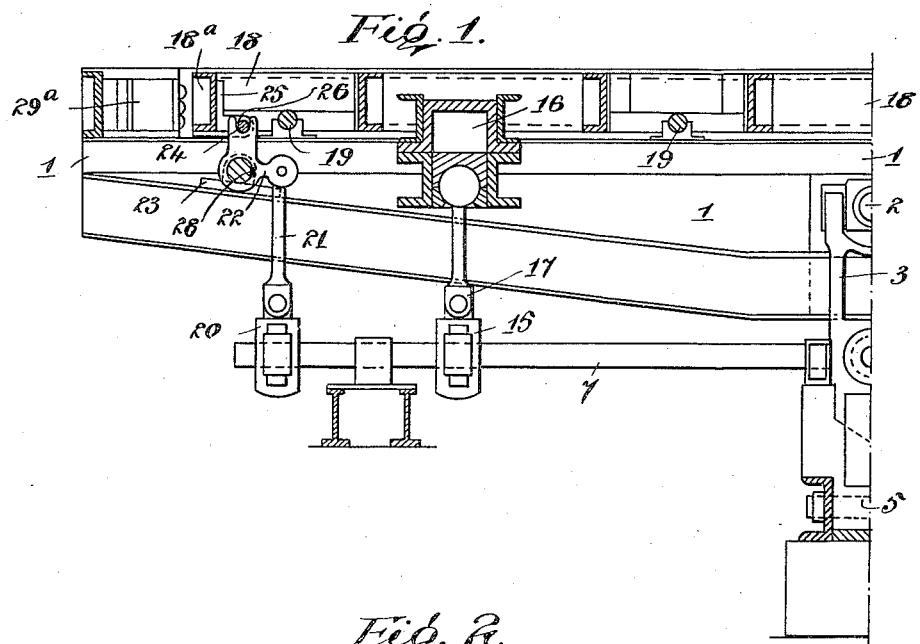
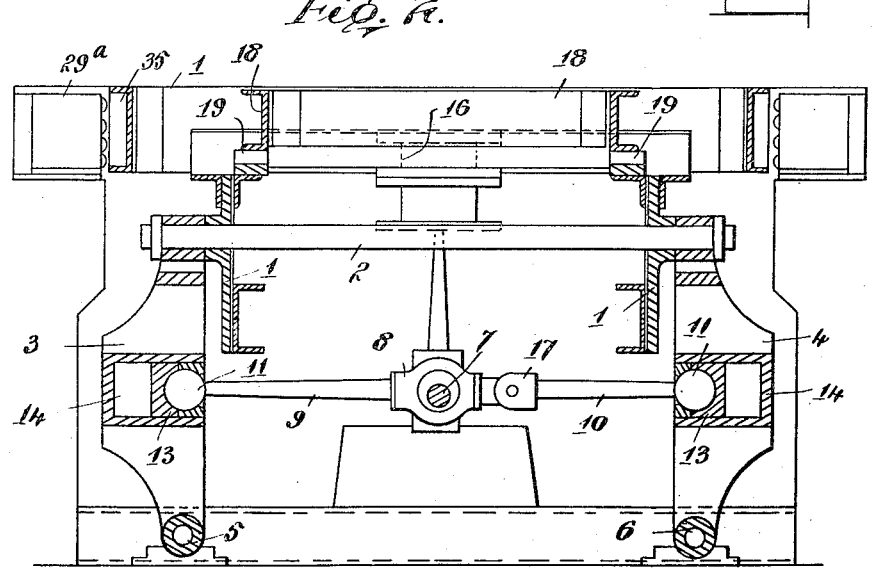
INVENTOR
PETER BURD JAGGER
By
ATTORNEY.

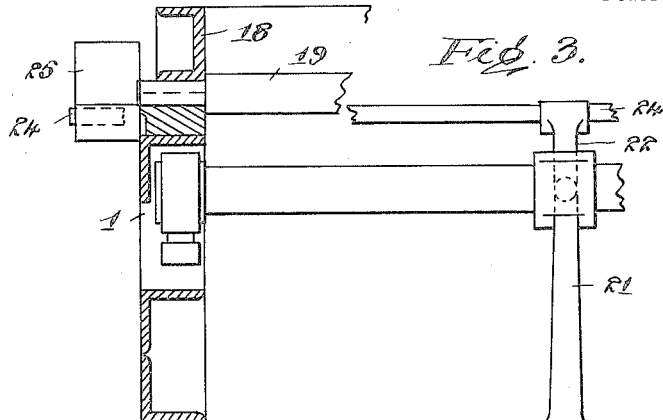
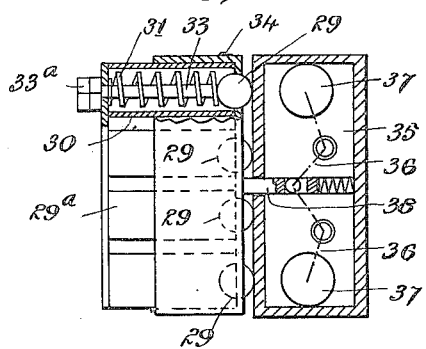
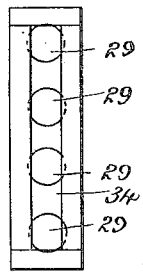
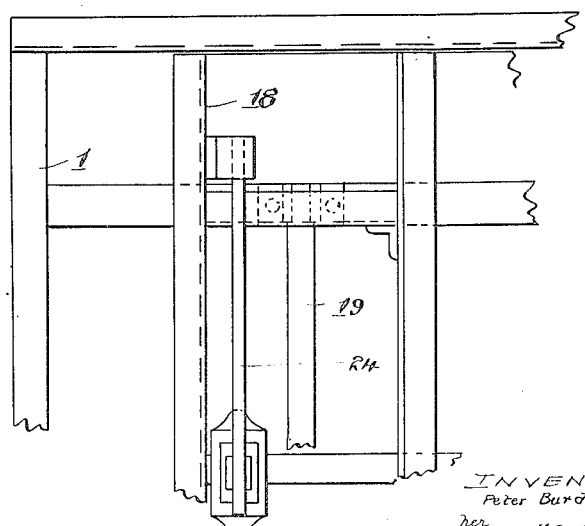

Patented Sept. 5, 1922.

1,428,097

UNITED STATES PATENT OFFICE.

PETER BURD JAGGER, OF LONDON, ENGLAND.

MOLDING AND / OR COMPACTING PLASTIC, FLUID, POWDERED, GRANULAR, OR THE LIKE SUBSTANCES.

Application filed February 25, 1921. Serial No. 447,862.

*To all whom it may concern:*

Be it known that I, PETER BURD JAGGER, a subject of the King of Great Britain, residing at London, England, have invented certain, new and useful Improvements in and Relating to Molding and / or Compacting Plastic, Fluid, Powdered, Granular, or the like Substances, of which the following is a specification.

The present invention relates to improvements in and relating to molding and / or compacting plastic, or fluid or powdered, granular or the like substances.

The present invention relates to improvements in the type of machine set forth in a prior specification of the present applicant, viz, No. 1,142,522.

In a well known machine of this class, commonly known as the Jagger vibrating table, a slab or platform on which the receptacles are placed, is simultaneously laterally reciprocated and rocked lengthways of the machine and a vertical blow is given alternatively at each end of the table by the alternate contact of the ends against stops or blocks appropriately arranged thereunder.

An object of the present invention is the more complete compacting of the substances it is desired to mold and / or compact; another object is the more complete control over the vibrations so as to accommodate the process to a wide range of substances, varying in the field of plastic materials from, for example, heavy concrete articles to the lighter kinds of constructional material such as those in which a metal network or mesh reinforcement is filled in with suitable material, for example, a hydraulic cement, all as solid dense structures capable of being drilled and tapped or rivetted like ordinary steel materials.

A further object of the invention is to obtain a more uniform distribution of the desired vibration through the machine and the more complete compaction or consolidation and the more even and steady settling down of the material over the whole area of the support, also the more complete elimination of air voids and, in the case of moist bodies, of excess moisture, and the better avoidance of stratification, all of which contribute as regards castings to the production of articles of great density and high compressive and tensile strength.

To these and other ends, a feature of the present invention is causing the receptacles or a support or platform for the receptacles on which the substances to be moulded and / or compacted are placed or gradually fed to independently vibrate horizontally or substantially horizontally for example in different vertical planes or in some equivalent manner, such as that in which each point would move in a small orbital path.

This independent horizontal vibration of the receptacles may be a reciprocating motion for example by appropriate mechanism of a sliding slab or platform appropriately mounted on the main support and capable of reciprocation in the direction of length of the main support, and this motion may be a suddenly arrested reciprocation of the receptacle so as to produce a series of horizontal or substantially horizontal blows. Otherwise for the production of horizontal or substantially horizontal blows any appropriate means may be provided by which a stop or a series of stops hit against some other surface or surfaces, or the receptacle itself or its carrier, such as a slab or platform, itself strikes against a stop or a series of stops.

In addition to the said independent reciprocating motion lengthwise of the support the receptacles may be given an independent lateral reciprocation with, if desired, a similar production of horizontal blows in the lateral direction.

Otherwise the longitudinal and lateral horizontal motions may be compounded and horizontal blows produced, if desired, at any point in the path of the resultant motion.

The support for the receptacles may itself be subjected to horizontal blows either in addition to or instead of the horizontal blows imparted to the receptacles or their carrier as above described.

The present invention is applicable to hot or cold bodies whether composite, liquid, or metallic for example to the manufacture of metal castings; the hot metal being placed in moulds on the vibrating slab or platform the resultant castings will be found to be generally much improved.

In the exemplar case of a main support adapted to be both rocked vertically and vibrated horizontally in the direction of the rocking axis and in which the desired movements are imparted to the support by carrying the support on a transverse shaft borne by two levers, these levers and also the support being actuated by eccentrics on a shaft running longitudinally of the machine, the connection of the eccentrics with the levers, also with the support is by hydraulic cylinder and piston connections with conveniently and advantageously a controlled flow of the fluid so as to vary or regulate the cushioning effect, such a hydraulic cushioning or buffering of the support in the way described or in some other appropriate manner forming part of the present invention.

In some cases the horizontal blows may be yielding blows, such as would result from the support striking balls set in spring urged sockets with provision for adjusting tension, this arrangement serving well in the case of a support capable of being rocked vertically while being simultaneously laterally reciprocated or bodily rotated. The spring arrangements, may be such that finally the spring element compresses up to a point at which a dead resistance or non-yielding stop is reached.

In the accompanying drawings there is illustrated by way of example a form of machine embodying the improvements forming the present invention.

In the drawings, Fig. 1 is a left half side view of the machine, the right half of the machine practically corresponding in detail to the left half. Fig. 2 is a sectional view at right angles to Fig. 1. Fig. 3 is a detail view of the mechanism for imparting independent reciprocating motion lengthwise of the machine. Figs. 4 and 5 are detail views hereinafter referred to, and Fig. 6 is a part plan view of the sliding slab or platform mounted on the rocking support.

Referring to the drawings, a main support 1 is adapted to be both rocked vertically and vibrated horizontally in the direction of the rocking axis. The desired movements are imparted to the support by carrying the support on a transverse shaft 2 forming the rocking axis, this transverse shaft 2 being borne by two levers 3 and 4, these levers being carried in suitable bearings 5 and 6. A main shaft 7 running longitudinally of the machine and driven by any suitable source of power has mounted thereon an eccentric 8. The eccentric 8 is for the purpose of imparting to the support 1 a horizontal movement in the direction of the rocking axis 2. The eccentric 8 is connected to the levers 3 and 4 by rods 9 and 10. The ends of the rods remote from the eccentric have ball joints 11 fitting into blocks 13. The blocks 13 form pistons working in cylinders or buffer boxes 14, the cylinders 14 being integral with or fixed one to each of the levers 3 and 4. The cylinders 14 has a medium therein functioning as a buffer, this buffer medium consisting of any suitable arrangement or element, whereby cushioning or buffering of the support is realized, suitable examples of buffer mediums being an air-buffer, a metal spring buffer, and a hydraulic buffer. In connection with an air or hydraulic cylinder and piston connections a controlled flow of the fluid may be conveniently and advantageous so as to vary or regulate the cushioning effect. In the case of a metal spring buffer means may be provided for adjusting the spring to the desired resistance for the work in hand.

The buffer arrangements may be such that finally a dead resistance or non-yielding stop is reached.

For imparting the rocking movement to the support 1 eccentrics 15 are mounted on the shaft 7. These eccentrics are connected to the support 1 by a similar arrangement as that provided for the eccentric 8. The cylinders 16 have a hydraulic or other suitable cushioning or buffering medium and function in similar manner to the cylinders 14.

To accomodate the eccentrics and their allied parts to the compound movements of the support 1 flexible joints 17 are provided in certain or all of the eccentric rods.

The independent horizontal vibration of the receptacles in the example of machine described is effected by means of a sliding slab or platform 18, appropriately mounted on the main support as by roller devices 19 and capable of reciprocation in the direction of length of the support. Eccentrics 20 mounted on the shaft 7 effect the horizontal reciprocation of the platform 18 through the intermediate mechanism. Each eccentric has a rod 21, the end thereof remote from the eccentric 20 being linked to a bell crank lever 22 having its pivot carried by a bracket 23 secured to the rocking support 1. A rod 24 carried by brackets 25 secured to the platform 18 contacts with a groove or the like 26 provided on the free end of the lever 22, so that upon rotation of the shaft 7 the eccentric through the intermediate mechanism imparts a horizontal reciprocating movement to the platform 18. Suitable compensation provision for the compound movements of the support 1 is provided as by the setting of the eccentric on the shaft 7 in relation to the setting of the eccentrics 8 and 15, flexible joints 27 and keyways 28. The sliding platform 18 is subjected to horizontal blows which in the example described are yielding blows.

Carried by the frame of the rocking support 1 are ball fittings 29$^a$ each fitting comprising balls 29 set in socket pieces 30. The balls 29 are urged by springs 31 housed in the socket pieces 30, the tension of the springs 31 being adjustable by bolt and nut devices 33, 33$^a$. A retaining plate 34 is provided.

The reciprocating movements imparted to the platform 18 bring an appropriate part thereof against the balls 29, the spring arrangements being such that finally the spring element compresses up to a point at which a dead resistance or non-yielding stop is reached.

In the illustrated machine the parts 18<sup>a</sup> of the platform 18 which collide with the balls 29 each have a box fitting 35, housing vibrating devices therein. In the form shown these vibrating devices comprise a lever arrangement 36 having rollers or the equivalent 37. The lever arrangement 36 is under the influence of a spring controlled bar or spindle 38 so positioned as to collide with an appropriate part of the ball fitting 30, for example, the retaining plate 34, simultaneously with the part 18<sup>a</sup> colliding with the balls 29. Thus a supplementary series of vibrations are set up in the platform 18 by the oscillation of the vibrating devices transmitted through the box 35.

It is to be understood that a ball fitting 29<sup>a</sup> and a co-operating box fitting may be placed at various suitable parts of the machine, and intermediate of the perimeter thereof and in conjunction with any of the reciprocating movements imparted to either the platform or the support. Further although in the exemplar construction the ball fitting and the box fitting are used in co-operation, either one may be used independent of the other. It is further to be understood that the particular arrangement of ball and box fittings described are merely given as examples of ways of carrying this feature of the present invention into effect.

In this way a beneficial more or less rapid pulsating effect may be realized; also by appropriate setting of the successively acting stops, individual pulsations may follow each other according to any regular or irregular system as desired.

With reference to the rocking movement imparted to the support 1, stops may be provided to assist in limiting the rocking movement.

In the case of a support constructed to receive a vertical rocking motion, the stops may be arranged medially of the ends of the support and the rocking axis.

The stops whether fixed or adjustable may be given any desired setting so as to vary effect at different parts of the support. For example the setting may be transverse or oblique or parallel with respect to the longitudinal axis of the support and may be curved or straight.

What I claim is:—

1. In a shaking or vibratory machine of the kind described for molding and/or compacting plastic, or fluid, or powdered, granular or the like substances, a main vibratory support, means for imparting movement to said support a platform on said support, said platform having an independent horizontal vibratory movement on said support, and means for imparting positive and controlled horizontal vibratory movement to the said platform relatively to the support and while vibrating therewith.

2. A machine as claimed in claim 1 hereof having means for suddenly arresting the positive and controlled horizontal vibratory movement of the platform for the purpose described.

3. A machine as claimed in claim 1 hereof having cushioning arrangements interposed between the actuating devices and appropriate parts of the machine.

4. In a shaking or vibratory machine of the kind described for molding and/or compacting plastic, or fluid, or powdered, granular or the like substances, a main vibratory support, means for imparting movement to said support, a platform on said support, said platform having an independent horizontal vibratory movement on said support, means for imparting positive and controlled horizontal vibratory movement to the said platform relatively to the support while vibrating therewith, means for suddenly arresting the horizontal vibratory movement of the platform so as to produce a series of blows, and means whereby the said blows may be yielding blows.

5. A shaking or vibratory machine of the kind described for molding and/or compacting plastic, or fluid, or powdered, granular or the like substances, comprising a platform for the receptacles capable of independent horizontal vibratory movement on a main support, means for imparting a rocking motion to the main support, means for imparting a horizontal vibrating movement to the main support, in the direction of the rocking axis, and means for imparting to the platform a positive and controlled independent horizontal vibratory movement, all the means being dependent for operation on a common drive.

6. A shaking or vibratory machine as claimed in claim 5 hereof having a transverse shaft, carrying the main support, and levers bearing the transverse shaft substantially as described.

7. A shaking or vibratory machine as claimed in claim 5 hereof in which the main support and the platform are actuated by eccentrics on a shaft running longitudinally of the machine substantially as described.

8. A shaking or vibratory machine as claimed in claim 1 hereof having supplementary vibratory devices carried by the platform.

9. A shaking or vibratory machine as claimed in claim 1 hereof having supplementary vibratory devices carried by the main support.

10. A shaking or vibratory machine of the kind described and for the purposes described, comprising a main support, a platform on said support capable of independent horizontal vibratory movement, means for imparting a rocking motion to said main support, means for imparting a horizontal vibratory movement to the main support in the direction of the rocking axis, means for imparting to the platform a positive and controlled independent horizontal vibratory movement, means for cushioning interposed between the actuating devices and the appropriate parts of the machine, means for producing a series of horizontal blows, and supplementary vibratory devices carried by the platform.

11. A shaking or vibratory machine for molding and/or compacting plastic, or fluid, or powdered, granular or the like substances, comprising a support for the receptacles, and the said support being subjected to a gradually arrested rocking motion, and the receptacles being subjected to an independent horizontal vibration.

12. A machine as claimed in claim 11 hereof in which the rocking support is horizontally vibrated under a regulated cushioning control.

13. A machine as claimed in claim 11 hereof in which the independently vibrated receptacles are subjected to horizontal blows.

14. In a shaking or vibratory machine of the kind described having a main vibrating support, a platform on said support, said platform having an independent horizontal vibratory movement on said support, means for effecting the horizontal reciprocation of the platform comprising an eccentric, a connecting rod, a bell crank lever, and co-operating parts, substantially as described.

15. In a shaking or vibratory machine of the kind described having a main vibratory support, a platform on said support, said platform having an independent horizontal vibratory movement on said support, a vibrating device comprising a spring controlled lever arrangement, substantially as and for the purposes described.

16. In a shaking or vibratory machine of the kind described having a main vibratory support, a platform on said support, said platform having an independent horizontal vibratory movement on said support, the provision of ball fittings substantially as and for the purpose described.

17. In a shaking or vibratory machine of the kind described having a main vibratory support, a platform on said support, said platform having an independent horizontal vibratory movement on said support, means for imparting a horizontal movement to said main support comprising an eccentric drive and a buffer device co-operating therewith.

18. In a shaking or vibratory machine of the kind described for molding and/or compacting plastic, or fluid, or powdered, granular or the like substances, having a main vibratory support, a platform on said support, said platform having an independent horizontal vibratory movement on said support, a common drive for operating the various devices for imparting the desired movements.

In testimony whereof, I affix my signature.

PETER BURD JAGGER.